Figure 1:
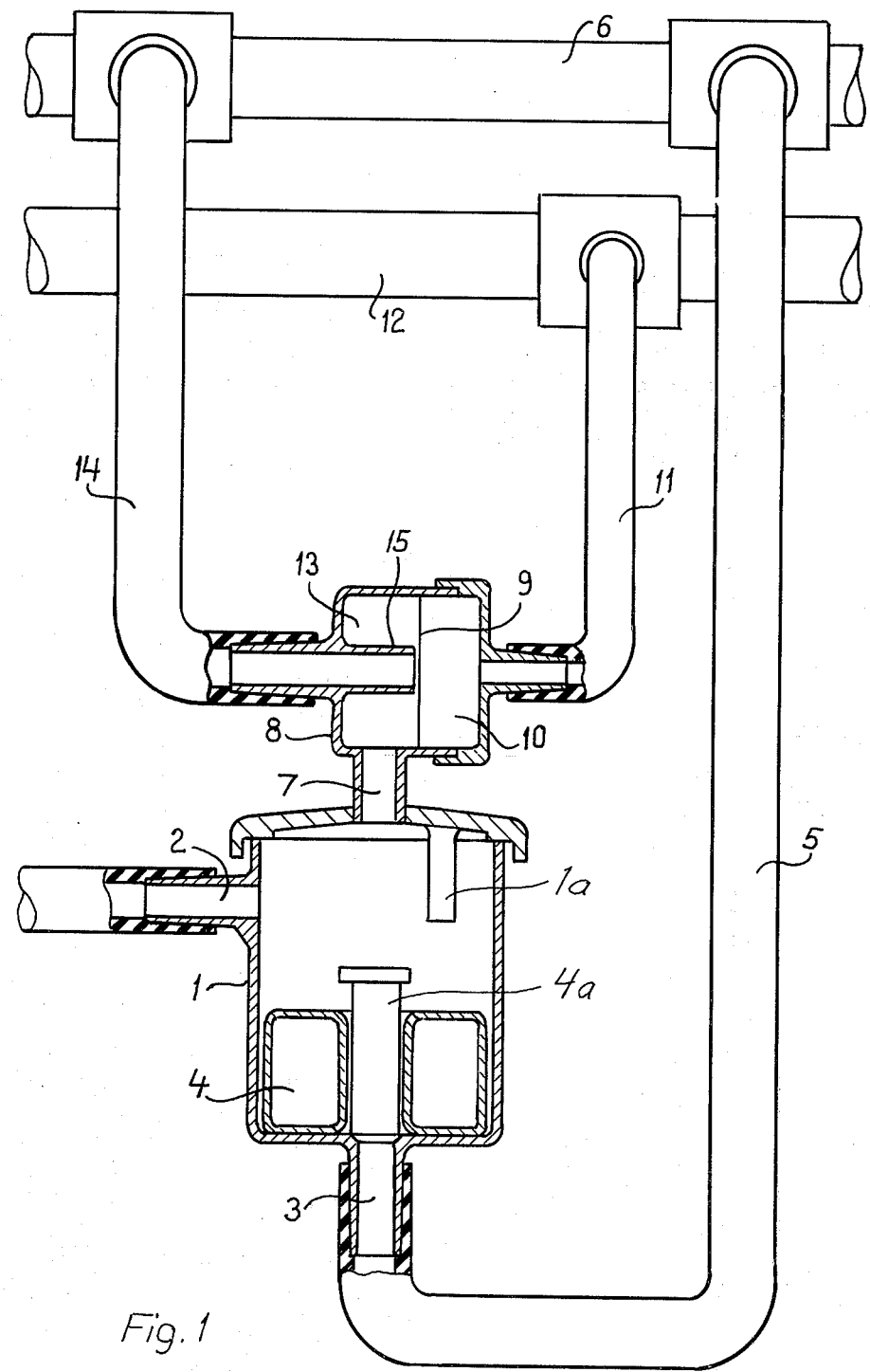

United States Patent [19]
Nordegren et al.

[11] 3,943,888
[45] Mar. 16, 1976

[54] PIPELINE MILKING SYSTEM

[75] Inventors: Sven-Ake Nordegren; Karl Erik Olander, both of Sodertalje, Sweden

[73] Assignee: Alfa-Laval AB, Tumba, Sweden

[22] Filed: Oct. 1, 1974

[21] Appl. No.: 510,999

[30] Foreign Application Priority Data
Oct. 30, 1973  Sweden .............................. 7314705

[52] U.S. Cl. ............................ 119/14.05; 119/14.46
[51] Int. Cl.² ........................................... A01J 9/00
[58] Field of Search ........... 119/14.01, 14.05, 14.06, 119/14.07, 14.08, 14.44, 14.46; 137/205

[56] References Cited
UNITED STATES PATENTS

| | | |
|---|---|---|
| 3,189,002 | 6/1965 | Noorlander ...................... 119/14.07 |
| 3,208,429 | 9/1965 | Noorlander ................... 119/14.46 X |
| 3,373,720 | 3/1968 | Duncan ....................... 119/14.08 X |

Primary Examiner—Hugh R. Chamblee
Attorney, Agent, or Firm—Cyrus S. Hapgood

[57] ABSTRACT

The pipeline milking system has a venting arrangement in the form of a receptacle having a milk inlet connected to a milking means, a milk outlet controlled by a float or the like and connected to the system's milk transport conduit, and an air outlet connected to a working vacuum source via a reducing means which comprises a control valve connected to a control vacuum source and operable to control the vacuum in the receptacle in relation to the control vacuum.

3 Claims, 2 Drawing Figures

PIPELINE MILKING SYSTEM

THE DISCLOSURE

The present invention relates to pipeline milking systems of the kind comprising a vacuum conduit adapted to be connected to a milking means via a pulsator to provide a massage operation, and a milk transport conduit adapted to be connected to the milk-carrying portion of the milking means, a higher vacuum being prevalent in the milk transport conduit than in the vacuum conduit.

In such pipeline milking systems, the connection between the milk transport conduit and the milk-carrying portion of the milking means must be provided with an arrangement which reduces the vacuum to a value suitable for milking. In U.S. Pat. No. 3,783,837, granted Jan. 8, 1974, there is shown such a reducing arrangement comprising a membrane valve. However, the use of such a reducing arrangement in the milk conveying conduit has proved to involve the disadvantage that the milk must pass through a narrow opening or gap in the reducing arrangement. More particularly, the milk emanating from the milking means contains air in the form of bubbles, so that when the milk passes through this opening or gap, an intensive mixing of this air and the milk takes place, which affects the quality and durability of the milk.

It is also known to let the milk emanating from the milking means pass through a receptacle which is provided with an air outlet connected to the vacuum conduit and with a milk outlet controlled by a float and connected to the milk transport conduit. By means of the float, a predetermined milk level is maintained in the receptacle, which allows air to depart through the air outlet, whereby milk generally free of air emanates through the milk outlet. Such an arrangement is shown in German published specification 1,276,397. Since the air outlet is connected to the vacuum conduit, no vacuum control valve is required, because the vacuum in this conduit can be adjusted to a value suitable for milking. The arrangement has the drawback, however, that small amounts of milk in the form of bubbles or foam may accompany the air separated from the milk into the vacuum conduit, so that even this conduit must be cleaned after the milking operation.

The principal object of the present invention is to provide a pipeline milking system which overcomes the above-noted drawbacks.

A pipeline milking system made according to the invention is provided with a venting arrangement in the form of a receptacle having a milk inlet connected to a milking means, a milk outlet controlled by a float or other level-sensing means and connected to the milk transport conduit of the plant, and an air outlet which is connected via a reducing means to a working vacuum source. The system according to the invention is characterized in that the reducing means comprises a control valve which is connected to a control vacuum source and adapted to control the vacuum in the receptacle in relation to the control vacuum.

The control valve preferably comprises a so-called membrane valve which is known per se and the interior of which is divided by means of a membrane into two chambers, one of which is connected to the control vacuum source, the other chamber being connected to the working vacuum source and also to the air outlet of the receptacle.

Figure 2:
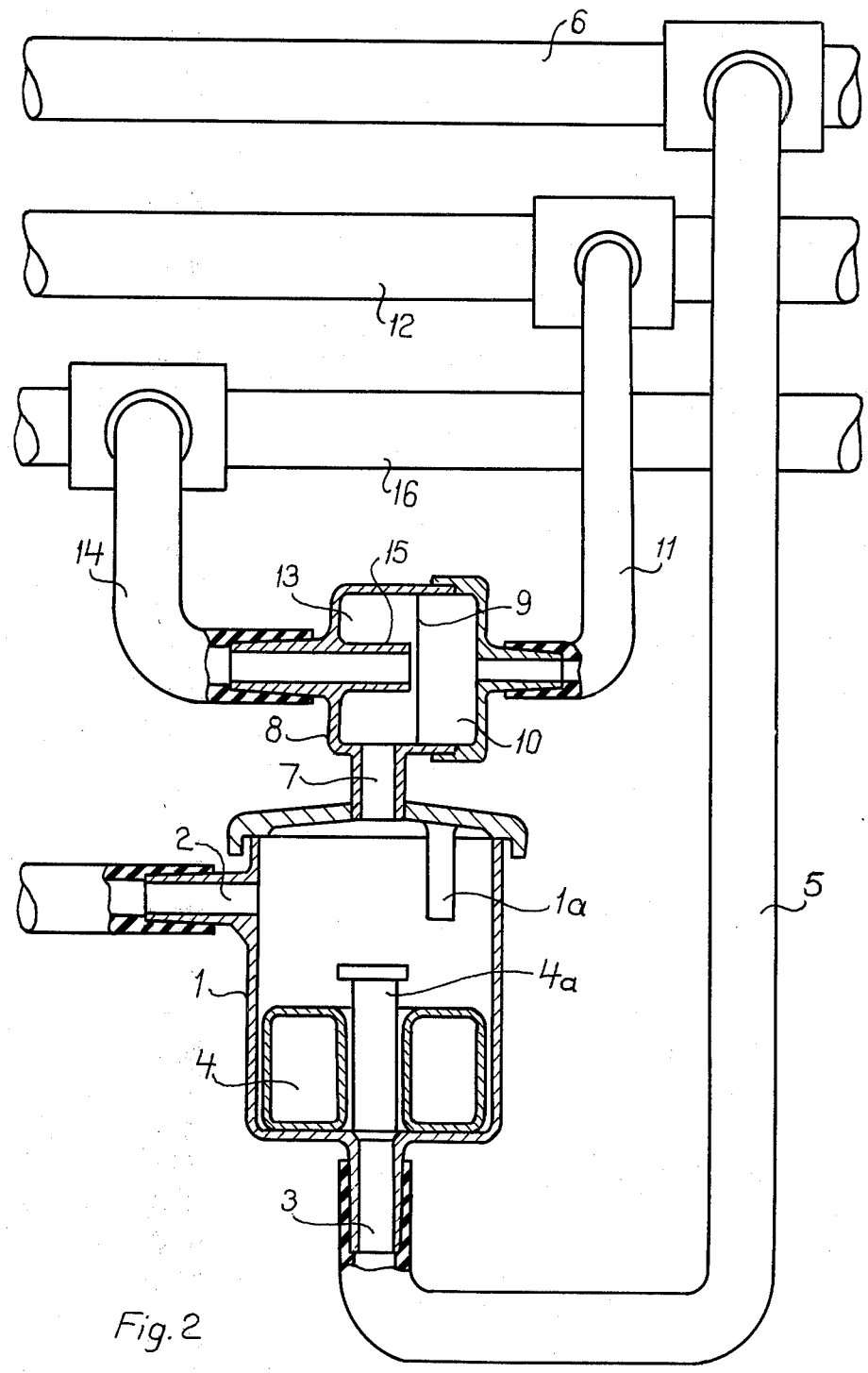

The invention will be described more in detail below with reference to the accompanying drawings, in which FIG. 1 is a diagrammatic view, partly in section, of a first embodiment and FIG. 2 is a similar view of a second embodiment of the invention.

The arrangement shown in FIG. 1 comprises a receptacle 1 having a milk inlet 2 which is connected to a milking means (not shown). At its lower end the receptacle 1 has a milk outlet 3 which is controlled by level sensing means shown as a float 4 and is connected by means of a hose 5 to a milk transport conduit 6. The float 4 is provided with a central, cylindrical pin 4a, the lower end of which closes the milk outlet 3 in the position shown. When the float moves upwards, the milk outlet is opened, the upward movement being restricted by a protrusion 1a extending downwards from the cover of the receptacle 1. At its upper end the receptacle has an air outlet 7 leading to a control valve 8. The interior of the valve 8 is divided by means of a membrane 9 into a right hand chamber 10, which is connected via a hose 11 and a conduit 12 to a control vacuum source (not shown), and a left hand chamber 13 which is connected to the air outlet 7 of the receptacle 1. The left hand valve chamber 13 is also connected to the milk transport conduit 6 via a hose 14 and a tube 15 extending into the chamber and opening adjacent the membrane 9, whereby a narrow gap is formed between the end of the tube and the membrane.

In the vacuum conduit 12 there is a stable vacuum, for example, a vacuum of 380 mm Hg, while there is a higher vacuum (e.g., 450 mm Hg) in the milk transport conduit 6 which, however, may vary due to certain disturbances. It should be pointed out that the above vacuum values are only examples, and other values may be used as well if appropriate with regard to the circumstances. The variations of pressure in the milk transport conduit 6 are levelled out by the valve 8, whereby a constant vacuum is obtained in the receptacle 1. That is, when the vacuum in the conduit 6 increases or decreases, the membrane 9 will move to or from the tube 15, respectively. The size of the gap between the membrane and the end of the tube is thereby controlled, whereby a constant vacuum is maintained in the receptacle 1. It is desirable that the vacuum in the milking means connected to the milk inlet 2 be kept constant.

If it should be desirable to change the vacuum in the receptacle 1, this can be done by increasing or decreasing the vacuum in the conduit 12 and thereby changing the position of the membrane 9, whereby a corresponding change of the vacuum in the receptacle is obtained.

The float valve 4-4a is of a known design and serves to open the milk outlet 3 when the milk level in the receptacle exceeds a predetermined value and to shut the milk outlet when the level drops below this value, whereby flow of air through the outlet 3 is prevented.

Cleaning of the system is carried out by introducing cleaning liquid through the milk inlet 2, the flow being so heavy that the entire amount cannot pass out through the outlet 3, whereby a portion of the flow will pass through the valve 8 and the hose 14 to the conduit 6. All surfaces which might be contacted by the milk are thereby cleaned. The right hand valve chamber 10, and thus the hose 11 and the conduit 12, are completely isolated by the membrane 9 and consequently need not be cleaned.

Since the milk does not pass through the valve 8, no unfavorable mixing of milk and air takes place, as was previously the case when membrane valves were used. The air is instead separated from the milk in the receptacle 1, and the milk is then conveyed without being mixed with air to the milk transport conduit 6 to be transported further to a storage tank (not shown).

In the embodiment of the invention shown in FIG. 2, the hose 14 is connected to a separate working vacuum conduit 16 in which there is a vacuum of generally the same magnitude as that in the conduit 6 and which is preferably connected to the same vacuum source as is the conduit 6. In other respects, the system is the same as that described above with reference to FIG. 1. In this arrangement in FIG. 2, milk and air are thus transported in separate conduits from the receptacle 1. Mixing of air into the milk during the transport through the conduit 6 is thus prevented, which is advantageous especially in large pipeline milking systems and when ascending milk transport conduits are involved.

The cleaning of the system in FIG. 2 is performed in the same way as has been described with reference to FIG. 1. The cleaning liquid entering through the milk inlet 2 flows out partially through the hose 5 to the conduit 6 and partially via the valve 8 and the hose 14 to the conduit 16, whereby both said conduits become cleaned. Thus, as in the arrangement according to the above-mentioned German published specification 1,276,397, two pipe conduits must be cleaned after the milking. However, an advantage of the embodiment according to FIG. 2 is that the maintaining of a more even vacuum in the receptacle 1 is made possible. That is, the vacuum in the conduit 12 is not exposed to any disturbances and can therefore easily be kept constant, which is not the case in the known arrangement in which the vacuum in the vacuum conduit will vary due to uneven loading by the rest of the milking means connected to the conduit.

In the example illustrated in FIG. 1, the milk transport conduit 6 is connected to a vacuum source (not shown) for drawing the milk to a suitable collecting place; and since conduit 6 is thus subjected to a working vacuum, it may be considered in part as a working vacuum source. In FIGS. 1 and 2, since conduit 12 is connected to a vacuum source (not shown) which maintains a constant vacuum in conduit 12, the latter may be considered in part as a control vacuum source. In FIG. 2, as previously indicated, conduit 16 is a separate working vacuum source.

We claim:

1. In a pipeline milking system, the combination of a milk transport conduit, a working vacuum source, a control vacuum source, and a venting arrangement comprising a receptacle hermetically separated from the control vacuum source and having a milk inlet for connection to a milking means, the receptacle also having a milk outlet connected to the milk transport conduit, means operable to sense the milk level in the receptacle for controlling the milk outlet, the receptacle also having an air outlet, and reducing means connecting the air outlet to the working vacuum source, the reducing means including a control valve connected to the control vacuum source and operable to control the vacuum in the receptacle in relation to the control vacuum.

2. The combination of claim 1, in which said control valve has a housing and a membrane dividing the interior of the housing into two chambers, one of said chambers being connected to the control vacuum source, the other chamber being connected to the working vacuum source and also to said air outlet of the receptacle.

3. The combination of claim 1, in which said air outlet of the receptacle is connected to the working vacuum source by way of a separate vacuum conduit.

* * * * *